(12) United States Patent
Morris et al.

(10) Patent No.: US 12,258,991 B2
(45) Date of Patent: Mar. 25, 2025

(54) CHANNEL NUT WITH OFFSET NOTCHES (71) Applicant: Hilti Aktiengesellschaft, Schaan (LI)

(72) Inventors: Nicholas Morris, Feldkirch (AT); Simon Fasser, Mauren (LI); Lukas Mundwiler, Gams (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 17/766,990

(22) PCT Filed: Jun. 19, 2020

(86) PCT No.: PCT/EP2020/067172
§ 371 (c)(1),
(2) Date: Apr. 6, 2022

(87) PCT Pub. No.: WO2021/069109
PCT Pub. Date: Apr. 15, 2021

(65) Prior Publication Data
US 2024/0077102 A1  Mar. 7, 2024

(30) Foreign Application Priority Data
Oct. 7, 2019 (EP) .................................... 19201678

(51) Int. Cl.
*F16B 37/04* (2006.01)
*B21D 53/24* (2006.01)

(52) U.S. Cl.
CPC ............ *F16B 37/045* (2013.01); *B21D 53/24* (2013.01)

(58) Field of Classification Search
CPC ............................. F16B 37/045; F16B 37/046
USPC ...................................................... 411/84, 85
See application file for complete search history.

(56) References Cited

U.S. PATENT DOCUMENTS

| | | | | |
|---|---|---|---|---|
| 4,429,440 A | * | 2/1984 | Laughlin | F16L 3/2431 248/62 |
| 4,784,552 A | * | 11/1988 | Rebentisch | F16B 37/046 403/348 |
| 4,917,553 A | | 4/1990 | Muller | |
| 5,022,614 A | * | 6/1991 | Rinderer | F16L 3/105 248/62 |
| 5,067,863 A | | 11/1991 | Kowalski | |

(Continued)

FOREIGN PATENT DOCUMENTS

| | | |
|---|---|---|
| DE | 41 08 175 A1 | 11/1992 |
| DE | 198 53 988 C1 | 9/2000 |

OTHER PUBLICATIONS

PCT/EP2020/067172, International Search Report dated Sep. 17, 2020 (Two (2) pages).

(Continued)

*Primary Examiner* — Flemming Saether
(74) *Attorney, Agent, or Firm* — Crowell & Moring LLP (57) ABSTRACT

A channel nut includes a web, a first flange projecting from the web where the first flange has a first notch for receiving a first lip of a strut channel, and a second flange projecting from the web where the second flange has a first notch for receiving the first lip of the strut channel. The first notch of the first flange and the first notch of the second flange are arranged in a non-aligned relationship with respect to each other such that the first notch of the first flange and the first notch of the second flange form a curved first seat for the first lip of the strut channel.

15 Claims, 5 Drawing Sheets

(56) References Cited

U.S. PATENT DOCUMENTS

| | | | | |
|---|---|---|---|---|
| 5,893,538 A * | 4/1999 | Onishi | ............... | F16L 3/2431 |
| | | | | 248/65 |
| 8,651,786 B2 * | 2/2014 | Merhar | ............... | F16B 37/046 |
| | | | | 411/84 |
| 10,364,567 B2 * | 7/2019 | Shang | ............... | E04B 1/5818 |

OTHER PUBLICATIONS

URL: https://www.unistrut.us/product-details/p6013, Channel Nut w/o Spring (13/16" Series), Aug. 7, 2019, (Four (4) pages).
URL: https://www.sikla.com/mainpage=133824/products-133850/e-catalog, Channel Nut NT 41, Aug. 7, 2019 (Seven (7) pages).

* cited by examiner

CHANNEL NUT WITH OFFSET NOTCHES

BACKGROUND AND SUMMARY OF THE INVENTION

The invention relates to a channel nut comprising a web, a first flange projecting from the web, wherein the first flange is provided with a first notch for receiving a first lip of a strut channel, and a second flange projecting from the web, wherein the second flange is provided with a first notch for receiving the first lip of the strut channel. The invention further relates to a fastener arrangement comprising such a channel nut and to a method for manufacturing such a channel nut.

DE4108175 A1 discloses an essentially massive channel nut with two straight toothless grooves for engaging the lips of a strut channel. The width of the channels decreases towards their respective bottoms in order to clamp the lips of the strut channel. DE19853988 C1 discloses a similar-principle channel nut, but in which the opening angle of each groove increases from its bottom towards its mouth. The increased opening angle near the mouth is intended to improve capturing of the lips of the strut channel.

U.S. Pat. No. 4,917,553 A discloses another essentially massive channel nut with two toothless grooves for engaging the lips of a strut channel. The grooves have a meandering shape each. The meandering shape is intended to correspondingly deform the lips of the strut channel when engaging the lips, leading to interlock between the channel nut and the lips.

U.S. Pat. No. 5,893,538 A describes U-shaped sheet metal channel nuts, each channel nut having a web as well as two flange flanges projecting therefrom. The flanges have structures that correspond to the strut channel that is to be engaged. Since the strut channel can have inclined lips, the corresponding structures in the flanges can also have inclined outlines.

https://www.unistrut.us/product-details/p6013 describes a channel nut named "P6013". This channel nut is provided with four teeth, which are arranged in two spaced ridge structures.

https://www.sikla.com/mainpage-133824/products-133850/e-catalogue-133826/siconnect-13865/pressix-cc-41-assembly-system-31980/channel-nut-nt-41-41207 describes a channel nut named "Channel Nut NT 41", which has a U-shaped sheet metal body. The U-shaped body has a toothing, located in the back of the central web of the U-shaped body.

It is an object of the invention to provide a channel nut that has particularly good performance, in particular with a view to resisting shear forces, at particularly low manufacturing effort, preferably both with respect to the channel nut and with respect to the strut channel on which the channel nut is to be installed, and which has particularly good versatility and is particularly easy to install. It is moreover an object to provide the intended installation configuration of such a channel nut and a method for manufacturing such a channel nut, which is particularly easy and to perform and which yields particularly well-performing channel nuts.

The inventive channel nut is characterized in that the first notch of the first flange and the first notch of the second flange are arranged in non-aligned relationship with respect to each other, the first notch of the first flange and the first notch of the second flange thereby forming a curved first seat for the first lip of the strut channel. In particular, the notch wall of the first notch of the first flange and the notch wall of the first notch of the second flange are arranged in non-aligned relationship with respect to each other, the first notch of the first flange and the first notch of the second flange thereby forming a curved first seat for the first lip of the strut channel.

Accordingly, the channel nut has two adjacent flanges, namely the first flange and the second flange, and a web connecting the two flanges. In each of the flanges is provided a first notch intended to receive a first lip of a strut channel in order to create an interlock between the first lip of the strut channel and the channel nut. The first notches of the channel nut are intentionally arranged out of alignment with each other. As a consequence of this intentional misalignment, the first notches form, together, a nonlinear, curved, undulated seat in which the first lip of the strut channel can be placed. When the linearly straight first lip of the strut channel is pressed into the curved and therefore non-corresponding first seat provided by the first notches, local bending and/or deformation will occur, which can provide a particularly efficient interlock between the channel nut and the channel. In particular, this interlock can also resist shear forces directed parallel to the strut channel and its lips in a particularly efficient manner. Preferably, the interlock can be achieved without providing toothing on the lips of the strut channel. Consequently, the channel nut can have particularly good performance at low manufacturing effort.

As already mentioned above, the first lip of the strut channel is preferably straight, straight at least in the longitudinal direction of the strut channel. As also already mentioned above, the first lip is preferably non-toothed, i.e., it does not have a toothing, since the curved, nonlinear outline of the first seat can provide reliably engagement of straight, non-toothed structures.

The web of the channel nut connects both flanges of the channel nut. Both flanges project from the web into the same direction. Accordingly, the flanges and the web define a shape that has U-shaped cross-section, wherein the flanges define the free legs and the web the middle leg of the U-shape. Both flanges and preferably also the web are preferentially metal parts, in particular steel pats. More preferably, both flanges and the web are integral, which can further facilitate manufacturing. In particular, the channel nut can be a sheet metal part, which can be advantageous in view of ease of manufacturing and performance.

The first notches are indentations in the margins of the respective flanges. They are intended to act against the margin of the first lip of the strut channel. In particular, the first notches can be finger-like, pointing towards the web. The first notches preferably originate from an edge surface section of the respective flange that is remote from the web.

Preferentially, the first notch of the first flange is V-shaped, and/or the first notch of the second flange is V-shaped. Accordingly, the width of the respective notch decreases as it approaches the bottom of the respective notch and/or as it approaches the web. In other words, the respective notch tapers towards its bottom and/or towards the web. The V-shape can wedge the first lip within the respective notch when the channel nut is pressed against the first lip, thereby forcing the first lip into the curved seat. Consequently, engagement between the channel nut and the channel can be brought about by translation forces, thereby providing a particularly simple installation mechanism. Moreover, the V-shape can allow using the channel nut with channel lips of different thickness, and/or it can provide a self-positioning mechanism of the channel nut with respect to the strut channel. In particular, the V-shape and its distance from the mounting through hole of the channel nut (which is described in more detail below) may create torque during installation, which can further improve engagement of and/or penetration into the first lip. Accordingly, particularly good performance, versatility and ease of use can be obtained.

It is particularly preferred that the V-shaped first notch of the first flange has a rounded bottom, and/or that the V-shaped first notch of the second flange has a rounded bottom. This can reduce stresses in the channel nut, thereby improving performance. Moreover, the rounded bottom can accommodate additional functional features, such as a cutting edge. However, the bottom of the respective notches could also be sharp. It is also possible that the V-shape includes areas with different opening angles, for example as described in DE19853988 C1.

In another preferred embodiment, the first flange and the second flange are parallel to each other, the first flange is perpendicular to the web, and/or the second flange is perpendicular to the web. This can yield a particularly robust and easy-to-manufacture channel nut.

The first notch of the first flange and the first notch of the second flange are preferentially offset, i.e., out of alignment, with respect to one another in a reference direction that extends parallel to a mold line formed between the web and the first flange. This design can be particularly easy to manufacture and particularly robust and high-performing. In accordance with usual definition in connection with sheet metal items, a mold line can be understood as the intersection of the surfaces adjacent to a bend, which is the dimension that the part would have if its bend had no radius. Preferably, the mold line is an outer mold line (OML).

The flanges each have two opposite flange faces and an edge surface surrounding the respective flange and connecting the opposite flange faces of the respective flange. The first notches originate from the edge surface of the respective flange and point into the respective flange.

According to another preferred embodiment of the invention, the first notch of the first flange extends perpendicularly, with respect to at least one of the flange faces of the first flange, through the first flange, more preferably perpendicularly with respect to both flange faces thereof. Accordingly, the first notch of the first flange is arranged in a non-inclined manner with respect to the first flange. In other words, the axis and/or the cylindrical notch surface of the first notch of the first flange is orientated perpendicularly to either one or both flange faces, i.e., flat sides, of the first flange, in particular to that flange face of the first flange which faces the second flange. It is further preferred that, alternatively or additionally, the first notch of the second flange extends perpendicularly, with respect to at least one of the flange faces of the second flange, through the second flange, more preferably perpendicularly with respect to both faces thereof. Accordingly, the first notch of the second flange is arranged in a non-inclined manner with respect to the second flange. In other words, the axis and/or the cylindrical notch surface of the first notch of the second flange is orientated perpendicularly to either one or both flange faces, i.e., flat sides, of the second flange, in particular to that flange face of the second flange which faces the first flange. The parallel arrangement can further improve performance and/or facilitate manufacturing, in particular when the channel nut is a sheet metal part. Preferably, a notching step can be employed, in which a stamping process is used in a press, so as to cut vertically with respect to the faces of the sheet metal workpiece.

The cylindrical notch surfaces of the respective notches might be regionally interrupted by additional structures, such as channel engagement structures, for example by a sharp cutting edge at the bottom of the respective notch.

According to another preferred embodiment of the invention, the first notch of the first flange extends all the way through the first flange, and/or the first notch of the second flange extends all the way through the second flange. Thus, the respective first notches extend from one flange face to the other flange face of the respective flange in which they are arranged, i.e., the first notches cut both opposite flange faces of the respective flanges, so that the first lip can be placed therein without the need to rupture material. This can be advantageous in view of manufacturing and ease of installation.

The first flange, the second flange and the web have preferably the same thickness. This can further facilitate manufacturing, in particular if the channel nut is a sheet metal part.

The web can be provided with a, preferably threaded, mounting through hole for receiving a mounting bolt. The mounting bolt can be intended for pulling the channel nut against the lips of the strut channel, thereby creating an interlock between the channel nut and the strut channel at the notches. In particular, the axis of the mounting hole can be parallel to the flanges and/or perpendicular to the web. The mounting hole can be threaded. Preferably, the channel nut further comprises a threaded a collar projecting from the web, which collar is aligned with the mounting hole and preferably coaxial with respect to the mounting hole. The collar can increase the thread length of the mounting hole and/or increase stiffness of the channel nut.

The strut channel preferably comprises, in addition to the first lip, a second lip, wherein both lips flank the mouth of the strut channel. In particular, both lips are parallel.

The strut channel preferably has a first channel wall and a second channel wall, which are preferably parallel to one another, and which are connected by a channel bottom. This channel bottom can be flat, but can also have more complex structures, such as V-shaped or W-shaped structures. Preferably, the strut channel has a first lip projecting inwardly from the first channel wall and a second lip projecting inwardly from the second channel wall. In particular, the lips are inturned lips.

It is particularly preferred that the first flange has a second notch for receiving the second lip of the strut channel, the second flange has a second notch for receiving the second lip of the strut channel, and the second notch of the first flange and the second notch of the second flange are arranged in non-aligned relationship with respect to each other, the second notch of the first flange and the second notch of the second flange thereby forming a curved second seat for the second lip of the strut channel. Accordingly, the channel nut can interlock, simultaneously, with both lips of the strut channel, employing analogous interlock mechanisms at each lip. The second notches are preferably designed and configured in analogy to the first notches. Reference is therefore made to the description of the first notches in that respect.

Preferably, the first notch of the first flange, the second notch of the second flange, the second notch of the first flange and the first notch of the second flange form a 180° rotationally symmetric pattern. In other words, the pattern formed by the notches looks the same when rotated by 180°. The increased symmetry can be advantageous in view of performance. The axis of rotational symmetry is preferably coaxial with the axis of the mounting through hole.

The invention also relates to the intended installation configuration of the channel nut. In particular, the invention also relates to a fastener arrangement comprising the channel nut and a strut channel comprising at least a first lip, wherein the first lip of the strut channel is received in the curved first seat of the channel nut. In particular, the first flange bites into the first lip at the first notch of the first flange and the second flange bites into the first lip at the first notch of the second flange. Preferably, the strut channel also comprises a second lip, wherein the second lip of the strut channel is received in the curved second seat of the channel nut. In particular, the first flange bites into the second lip at the second notch of the first flange and the second flange bites into the second lip at second notch of the second flange. In particular, the lips of the strut channel are straight, for an intentional mismatch between the lips and their dedicated seats, in particular for providing particularly good interlock between the channel nut and the strut channel.

Preferably, the first lip and, where applicable, also the second lip of the strut channel could be untoothed. This can significantly reduce manufacturing expense. The intentional mismatch can provide particularly good engagement also of non-toothed lips.

The invention also relates to a method for manufacturing a channel nut, comprising a cutting step, in which at least the first notch of the first flange is cut, and a notch resizing step, which follows the cutting step, in which at least the first notch of the first flange is resized by laterally pressing at least one calibration tool against the notch surface of the first notch of the first flange, thereby work hardening material adjacent to the notch surface of the first notch of the first flange.

Accordingly, the notch is formed in consecutive steps. In a first step, namely in the cutting step, it is initially formed, and in the following notch resizing step, it is further deformed, preferably slightly enlarged, by pressing the calibration tool against the notch wall of the notch, in order to work harden material surrounding the notch. The calibration tool is advanced laterally, which in this connection can in particular imply perpendicularly to the flange in which the respective notch is located and/or parallelly to the flat faces surrounding the notch. This can give, at particularly low manufacturing effort, particularly well-performing channel nuts, as the work hardened material can provide particularly good interlock with the strut channel. In the notch resizing step, it is also possible to provide the bottom of the respective notch with an additional channel engagement structure, such as a cutting edge. If burrs are caused in either the cutting step or the notch resizing step, this can be advantageous to produce sharp edges for additional strut channel engagement. The term cut can refer to any process that is used to remove material, such as stamping, but also laser removal or water jet removal. Preferably, the cutting step is a sheet metal stamping step, in which the first notch of the first flange is stamped out.

It is especially preferred that, in the cutting step, at least the first notch of the first flange and the first notch of the second flange are cut, that the calibration tool is a common calibration tool, and that in the notch resizing step, which follows the cutting step, at least the first notch of the first flange and the first notch of the second flange are resized by laterally pressing at least the common calibration tool against the notch surface of the first notch of the first flange and, simultaneously, against the notch surface of the first notch of the second flange, thereby work hardening flange material adjacent to the notch surface of the first notch of the first flange and adjacent to the notch surface of the first notch of the second flange. More preferably, all of the first and second notches are cut in the cutting step, and in the notch resizing step, all of the first and second notches are simultaneously resized as described, using the at least the common calibration tool. These embodiments can further facilitate and/or speed up manufacturing.

According to another preferred embodiment, the method further comprises a flange bending step, in which at least the first flange is bent up, wherein the flange bending step follows the cutting step and the notch resizing step follows the flange bending step. Preferably, both the first flange and the second flange are bent up in the flange bending step. Accordingly, at least the first flange is erected between the cutting step and the notch resizing step, which provides particularly good access for laterally advancing the calibration tool, in particular the common calibration tool, in the notch resizing step. The term bend can refer to material being formed using a stake, brake, folder, die, roller, or similar tool.

Features that are described here in connection with the channel nut can also be used in connection with any of the fastener arrangement or the method for manufacturing a channel nut, and vice versa.

The invention is explained in greater detail below with reference to preferred exemplary embodiments, which are depicted schematically in the accompanying drawings. Individual features of the exemplary embodiments presented below can be implemented either individually or in any combination within the scope of the present invention.

DETAILED DESCRIPTION OF THE DRAWINGS

FIGS. 1 to 8 show an example of a channel nut. The shown channel nut comprises a flat web 3, which has essentially angled-parallelogram shaped outline. A mounting through hole 8 traverses the web 3. The mounting through hole 8 extends perpendicular to the web 3, i.e., perpendicular to the faces of the web 3, which faces are penetrated by the mounting through hole 8. The axis of the mounting through hole 8, which is orientated perpendicular to the faces of the web 3, is coaxial with the centre of the parallelogram shape. The mounting through hole 8 is threaded. The channel nut moreover comprises a collar 9, which projects from the web 3, and which is arranged coaxially with respect to the mounting through hole 8. The collar 9 extends the thread length of the mounting through hole 8 and stiffens the web 3.

The channel nut further comprises a first flange 1 and a second flange 2. The first flange 1 and the second flange 2, respectively, project from opposite edges of the parallelogram-shaped web 3, into the same direction. Both the first flange 1 and the second flange 2 have essentially rectangular outline. The first flange 1 and the second flange 2 are parallel to each other. The web 3, the first flange 1 and the second flange 2 form a structure having a U-shaped cross-section, wherein flanges 1 and 2 define the side legs and the web 3 the middle leg of the U-shape. The above-mentioned collar 9 projects in the same direction as the flanges 1 and 2 do, i.e., the collar 9 is arranged between the flanges 1 and 2.

The first flange 1 has two parallel flange faces 63' and 63", and an edge surface 65 connecting the flange faces 63' and 63". Flange face 63' of the first flange 1 faces the second flange 2. The second flange 2 has two parallel flange faces 64' and 64", and an edge surface 66 connecting the flange faces 64' and 64". Flange face 64' of the second flange 2 faces the first flange 1.

The channel nut is a sheet metal part and thus, the first flange 1, the second flange 2 and the web 3 are integral. Preferably, these flanges 1 and 2 and the web 3 consist of steel and or have same thickness.

The first flange 1 is provided with a first notch 11 and with a second notch 12. Each of these notches 11, 12 originates from the edge surface 65 of the first flange 1, more precisely from a section of the edge surface 65 which is arranged remote from the web 3, opposite the web 3, on the first flange 1. Originating from the edge surface 65 of the first flange 1, the notches 11 and 12 of the first flange 1 point towards the web 3. Each of the notches 11 and 12 of the first flange 1 is V-shaped, with a rounded bottom. In cross direction, the notches 11, 12 extend all the way through the first flange 1, i.e., they extend from the inner flange face 63' of the first flange 1 to the outer flange face 63" of the first flange 1. The first notch 11 of the first flange 1 is, at least regionally, limited by an essentially cylindrical notch surface 51 (a generalised cylinder is the surface formed by the motion of a line—the generator—moving parallel to itself and intersecting a given curve—the directrix—which directrix would be an open curve in the present case). The notch surface 51 and/or the axis of the first notch 11 of the first flange 1 extend perpendicularly to both flange faces 63' and 63" of the first flange 1, i.e., the first notch 11 is a perpendicular hole with respect to both flange faces 63' and 63" of the first flange 1. In analogy, the second notch 12 of the first flange 1 is a perpendicular hole with respect to both flange faces 63' and 63" of the first flange 1.

The second flange 2 is provided with a first notch 21 and with a second notch 22. Each of these notches 21, 22 originates from the edge surface 66 of the second flange 2, more precisely from a section of the edge surface 66 which is arranged remote from the web 3, opposite the web 3, on the second flange 2. Originating from the edge surface 66 of the second flange 2, the notches 21 and 22 of the second flange 2 point towards the web 3. Each of the notches 21 and 22 of the second flange 2 is V-shaped, with a rounded bottom. In cross direction, the notches 21, 22 extend all the way through the second flange 2, i.e., they extend from the inner flange face 64' of the second flange 2 to the outer flange face 64" of the second flange 2. The first notch 21 of the second flange 2 is, at least regionally, limited by an essentially cylindrical notch surface 52. The notch surface 52 and/or the axis of the first notch 21 of the second flange 2 extend perpendicularly to both flange faces 64' and 64" of the second flange 2, i.e., the first notch 21 is a perpendicular hole with respect to both flange faces 64' and 64" of the second flange 2. In analogy, the second notch 22 of the second flange 2 is a perpendicular hole with respect to both flange faces 64' and 64" of the second flange 2.

The first notch 11 of the first flange 1 and the first notch 21 of the second flange 2 are arranged with an offset 96 (explicitly indicated in FIG. 7) in a reference direction 95, which reference direction 95 extends parallel to the outer mold line 94 formed between the web 3 and the first flange 1. Accordingly, the reference direction 95 is both parallel to the flange faces 63' and 63" of the first flange 1 and parallel to the faces of the web 3. In the shown embodiment, the outer mold line 94 formed between the web 3 and the first flange 1 is parallel to the outer mold line formed between the web 3 and the second flange 2, since the flanges 1 and 2 are parallel. Therefore, the reference direction 95 extends also parallel to the outer mold line formed between the web 3 and the second flange 2 and the reference direction 95 is both parallel to the flange faces 64' and 64" of the second flange 2 and parallel to the faces of the web 3.

Figure 1:
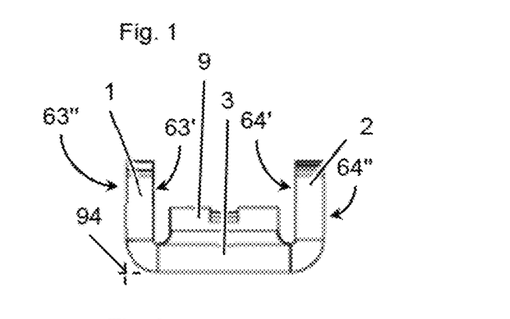
FIGS. 1 to 8 are different views of an example of a channel nut.
Figure 2:
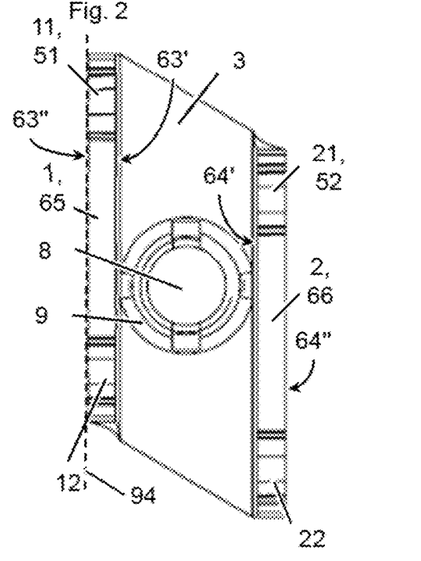
Figure 3:
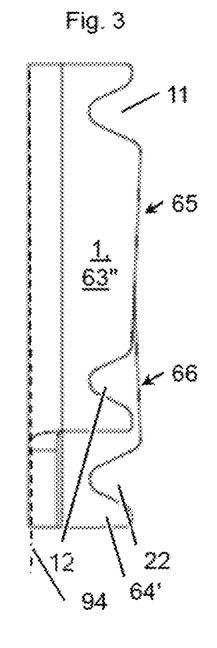
Figure 4:
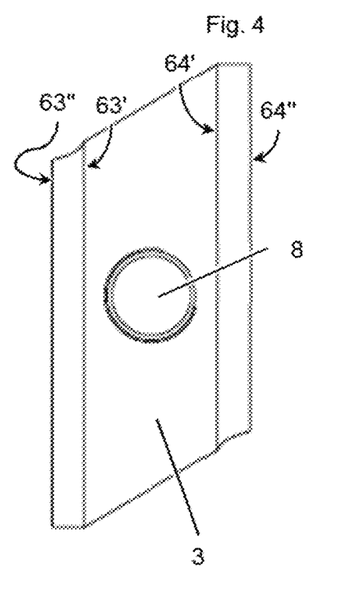
Figure 5:
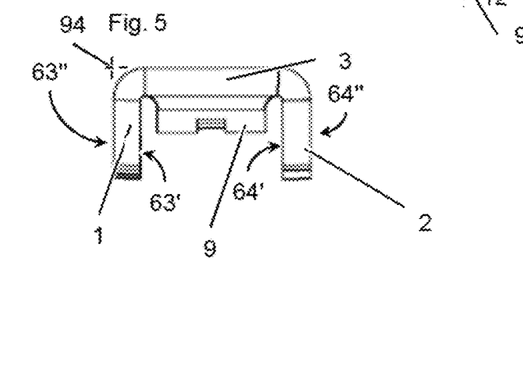
Figure 6:
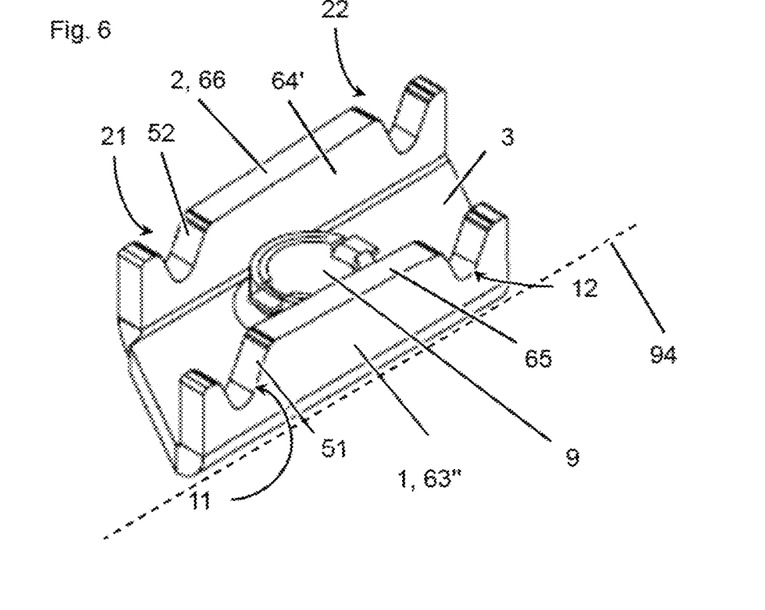
Figure 7:
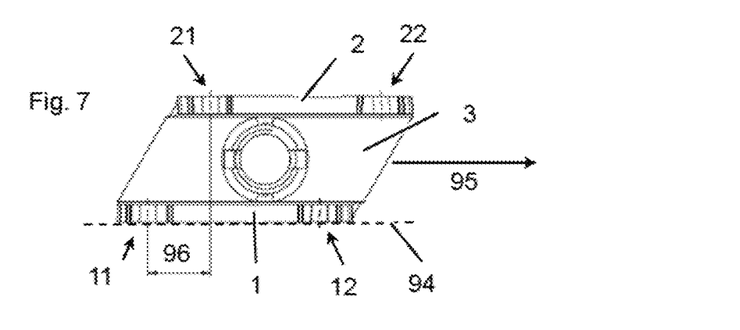
Figure 8:
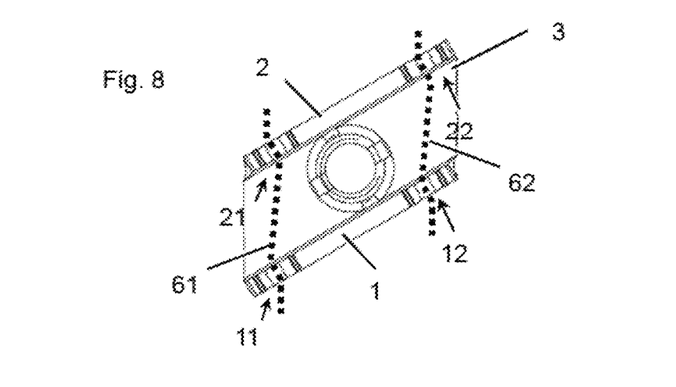

The second notches 12 and 22 also have offset in the reference direction 95, and the offset of the second notches 12 and 22 is the same as that of the first notches 11 and 21. All of the notches 11, 22, 12 and 22 have essentially the same shape. The notches 11, 22, 12 and 22 form a pattern that is 180° rotationally symmetric around an axis that is coaxial with the axis of the mounting through hole 8. Each of the notches 11, 22, 12 and 22 has a respective notch wall, which delimits the respective notch.

Due to their offset 96 and due to their perpendicular alignment with respect to the flanges 1 and 2, the first notches 11 and 21, in particular their respective notch walls, are in an axially non-aligned relationship with respect to each other. They thus form a curved first seat 61 (explicitly indicated in FIG. 8) for a straight first lip 81 of a strut channel. In analogy, due to their offset and due to their perpendicular alignment with respect to the flanges 1 and 2, also the second notches 12 and 22, in particular their respective notch walls, are in an axially non-aligned relationship with respect to each other. They thus form a curved second seat 62 (explicitly indicated in FIG. 8) for a straight second lip 82 of a strut channel.

Figure 9:
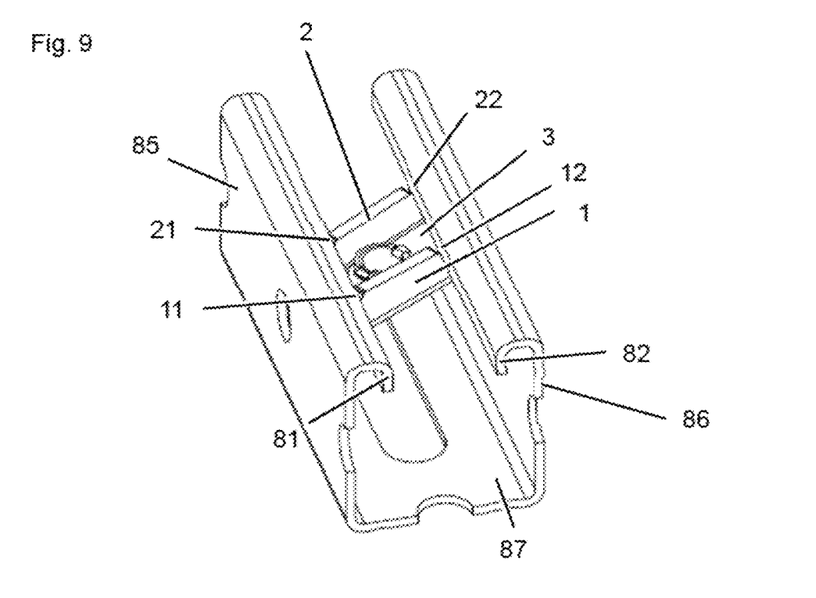
FIGS. 9 to 11 are different views of a fastener arrangement comprising the channel nut of FIGS. 1 to 8 and a strut channel.
Figure 10:
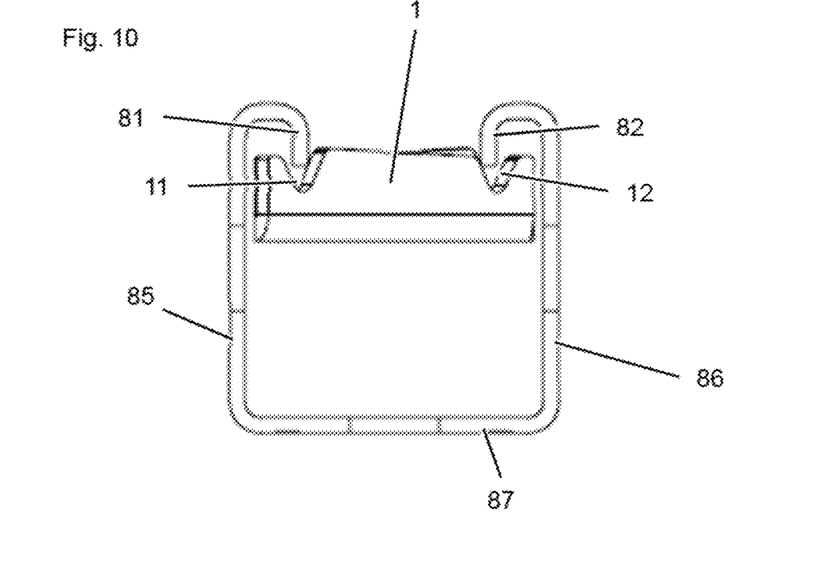
Figure 11:
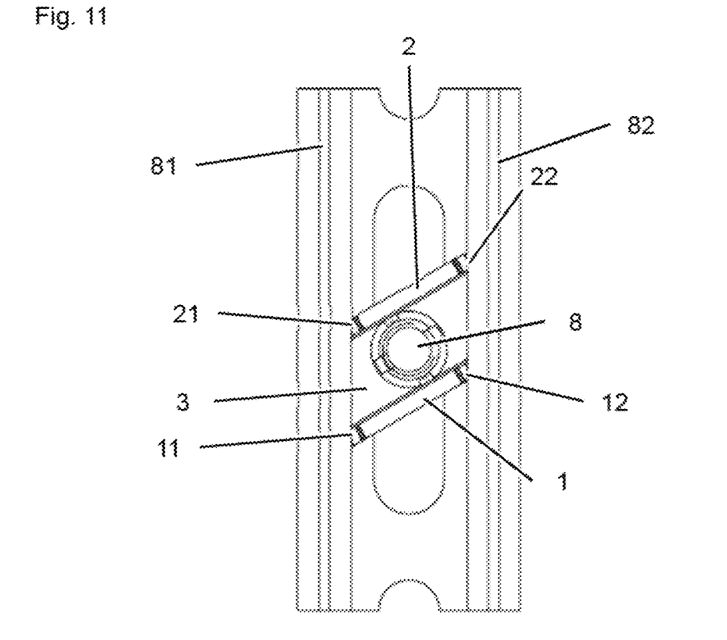

The channel nut can be fixed to a strut channel, resembling that which is shown in FIGS. 9 to 11. The shown strut channel is a C-channel and comprises a channel bottom 87 and two parallel channel walls 85 and 86 projecting therefrom. The first lip 81 of the strut channel inwardly projects from the first channel wall 85 and the second lip 82 of the strut channel inwardly projects from the second channel wall 86.

During installation, the channel nut is so positioned that the first lip 81 of the strut channel is received in the curved first seat 61 of the channel nut and the second lip 82 of the strut channel is received in the curved second seat 62 of the channel nut. Pre-fixing in this position can be effected by a—not-shown—spring connected to the channel nut and resting either on the channel bottom 87 or on the lips 81, 82 of the strut channel, as generally known in the art. The lips 81 and 82 are then pressed into their respective curved seats 61 or 62, for example by means of a not shown bolt screwingly engaging the mounting through hole 8. As the curved seats 61 and 62 intentionally mismatch the corresponding straight lips 81 and 82, forcing the lips 81 and 82 into their respective seats 61 or 62 causes stress and deformation. In particular, the flanges 1 and 2 may cut into the lips 81 and 82 and/or the lips 81 and 82 may bend into their respective curved seats 61 or 62. This can create a robust interlock between the channel nut and the strut channel, preferably an interlock that can also withstand significant shear forces directed alongside the strut channel. In particular, the first flange 1 may cut into the first lip 81 at the first notch 11 of the first flange 1 and the second flange 2 may cut into the first lip 81 at the first notch 21 of the second flange 2 and/or the first flange 1 may cut into the second lip 82 at the second notch 12 of the first flange 1 and the second flange 2 may cut into the second lip 82 at the second notch 21 of the second flange 2.

In particular, due to the intentional misalignment, two opposite ridges arise on each of the first notches 11, 12, which ridges can laterally engage the straight first lips 81 of the strut channel when the first lip 81 is positioned within the seat 61 created by the first notches 81, 82. The ridges, acting against the first lip 81 on both sides, can focus the stress on a line, which can aid the penetration into the lip 81 of the strut channel from both sides. An analogous configuration is present at the second notches 21, 22 and the second lip 82.

Figure 12:
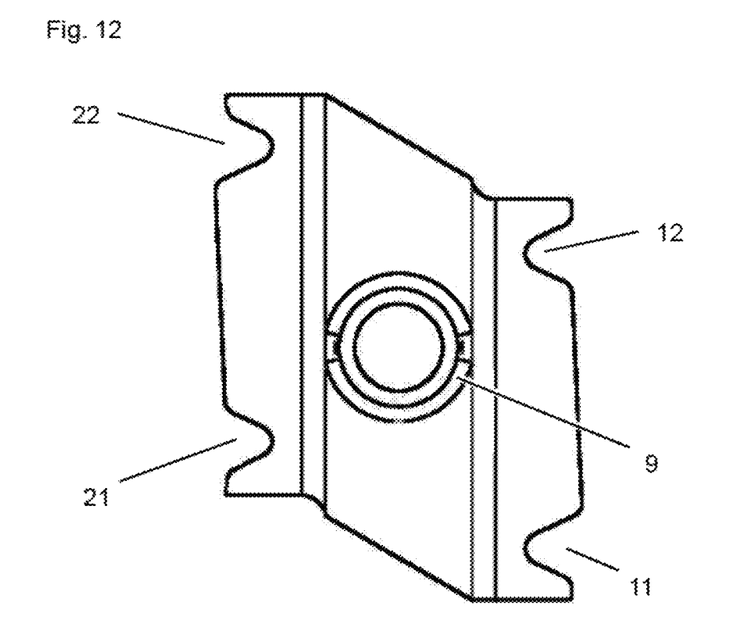
FIGS. 12 to 14 shown consecutive stages of a method for manufacturing the channel nut of FIGS. 1 to 8.
Figure 13:
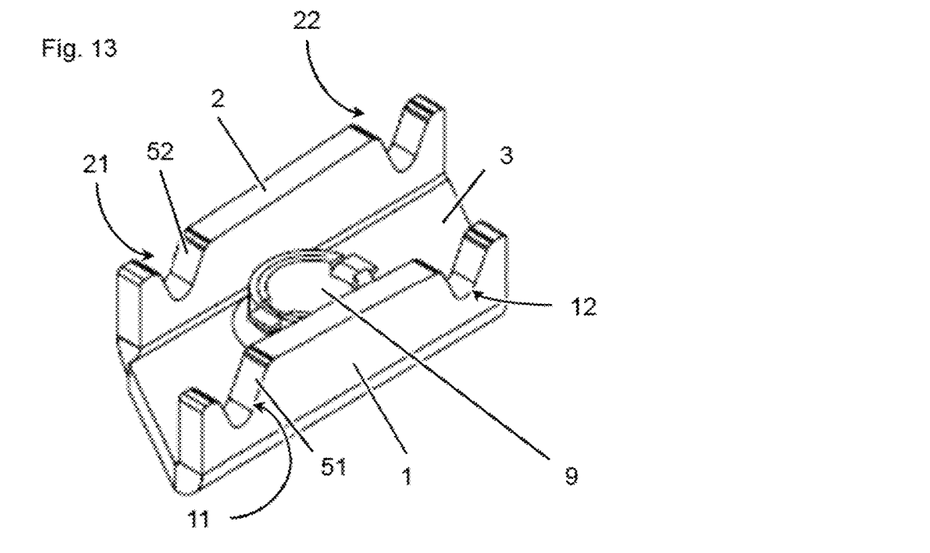
Figure 14:
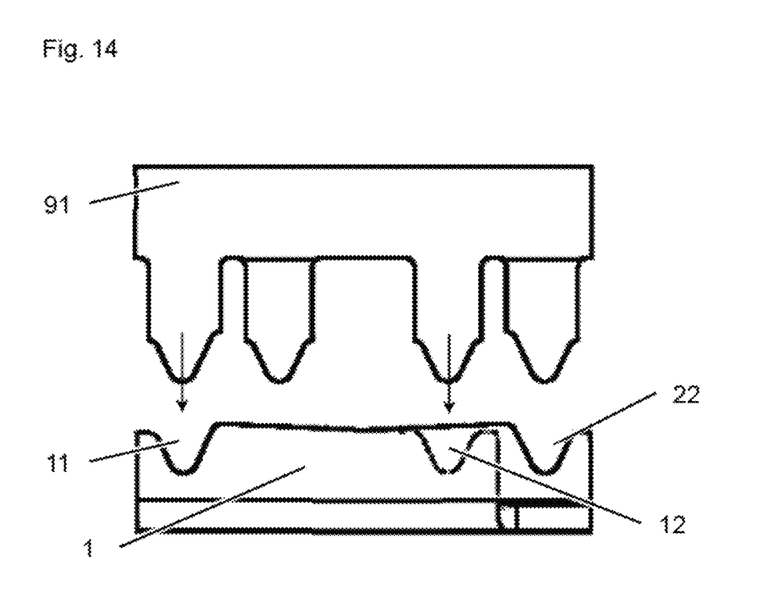

FIGS. 12 to 14 illustrate consecutive steps of a method for manufacturing the described channel nut. In a first cutting step, all of the first notches 11, 21 and second notches 12, 22 are cut out of a mostly (in particular except for the collar 9) flat metal workpiece using sheet metal stamping. The structure resulting from this step is shown in FIG. 12.

Afterwards, in a flange bending step, the first flange 1 and the second flange 2 are bent up from the web 3, resulting in the structure shown in FIG. 13.

Afterwards, in a notch resizing step, a calibration tool 91 is laterally, with respect to the first flange 1 and with respect to the second flange 2, pressed into each of the notches 11, 12, 21, 22, against their respective notch surfaces 51, 52, thereby slightly enlarging the notches 11, 12, 21, 22 and work hardening the surrounding channel nut material. This process is illustrated in FIG. 14, in which the direction of operation of the calibration tool 91 is indicated by arrows. In the shown embodiment, the calibration tool 91 is a common calibration tool which simultaneously acts in all of the notches 11, 12, 21, 22. However, it is also possible to use separate calibration tools for one or more of the notches 11, 12, 21, 22.

The invention claimed is:

1. A channel nut, comprising:
a web (3);
a first flange (1) projecting from the web (3), wherein the first flange (1) has a first notch (11) for receiving a straight first lip (81) of a strut channel; and
a second flange (2) projecting from the web (3), wherein the second flange (2) has a first notch (21) for receiving the straight first lip (81) of the strut channel;
wherein the first notch (11) of the first flange (1) has an axis that is parallel to a notch surface defined as an inner facing surface of the first notch (11) of the first flange (1) and the first notch (21) of the second flange (2) has an axis that is parallel to a notch surface defined as an inner facing surface of the first notch (21) of the second flange (2) and wherein the axis of the first notch (11) of the first flange (1) and the axis of the first notch (21) of the second flange (2) are arranged in an axially non-aligned relationship with respect to each other such that the first notch (11) of the first flange (1) and the first notch (21) of the second flange (2) form a curved first seat (61) for the straight first lip (81) of the strut channel;
wherein the axis of the first notch (11) of the first flange (1) and the axis of the first notch (21) of the second flange (2) are offset with respect to one another in a reference direction (95) that extends parallel to a mold line (94) formed between the web (3) and the first flange (1).

2. The channel nut according to claim 1, wherein the channel nut is a sheet metal part.

3. The channel nut according to claim 1, wherein the first notch (11) of the first flange (1) is V-shaped and/or the first notch (21) of the second flange (2) is V-shaped.

4. The channel nut according to claim 1, wherein the first notch (11) of the first flange (1) has a rounded bottom and/or the first notch (21) of the second flange (2) has a rounded bottom.

5. The channel nut according to claim 1, wherein the first flange (1) and the second flange (2) are parallel to each other, wherein the first flange (1) is perpendicular to the web (3), and wherein the second flange (2) is perpendicular to the web (3).

6. The channel nut according to claim 1, wherein the first notch (11) of the first flange (1) extends perpendicularly with respect to at least one of two flange faces (63', 63") of the first flange (1) through the first flange (1) and/or wherein the first notch (21) of the second flange (2) extends perpendicularly with respect to at least one of two flange faces (64', 64") of the second flange (2) through the second flange (2).

7. The channel nut according to claim 1, wherein the first notch (11) of the first flange (1) extends entirely through the first flange (1) and/or wherein the first notch (21) of the second flange (2) extends entirely through the second flange (2).

8. The channel nut according to claim 1, wherein the web (3) has a mounting through hole (8) for receiving a mounting bolt.

9. The channel nut according to claim 1, wherein the first flange (1) has a second notch (12) for receiving a second lip (82) of the strut channel, wherein the second flange (2) has a second notch (22) for receiving the second lip (82) of the strut channel, and wherein the second notch (12) of the first flange (1) and the second notch (22) of the second flange (2) are arranged in a non-aligned relationship with respect to each other such that the second notch (12) of the first flange (1) and the second notch (22) of the second flange (2) form a curved second seat (62) for the second lip (82) of the strut channel.

10. The channel nut according to claim 9, wherein the first notch (11) of the first flange (1), the second notch (22) of the second flange (2), the second notch (12) of the first flange (1), and the first notch (21) of the second flange (2) form a 180° rotationally symmetric pattern.

11. A fastener arrangement, comprising:
the channel nut according to claim 1; and
a strut channel that includes a straight first lip (81), wherein the straight first lip (81) of the strut channel is disposed in the curved first seat (61) of the channel nut.

12. The fastener arrangement according to claim 11, wherein the straight first lip (81) is untoothed.

13. A method for manufacturing the channel nut according to claim 1, comprising:
a cutting step in which at least the first notch (11) of the first flange (1) is cut; and
a notch resizing step which follows the cutting step in which at least the first notch (11) of the first flange (1) is resized by laterally pressing at least one calibration tool (91) against a notch surface (51) of the first notch (11) of the first flange (1) thereby work hardening material adjacent to the notch surface (51) of the first notch (11) of the first flange (1).

14. The method according to claim 13, wherein:
in the cutting step, at least the first notch (11) of the first flange (1) and the first notch (21) of the second flange (2) are cut;
the calibration tool (91) is a common calibration tool (91); and
in the notch resizing step, at least the first notch (11) of the first flange (1) and the first notch (21) of the second flange (2) are resized by laterally pressing the at least one common calibration tool (91) against the notch surface (51) of the first notch (11) of the first flange (1) and, simultaneously, against a notch surface (52) of the first notch (21) of the second flange (2) thereby work hardening respective flange material adjacent to the notch surface (51) of the first notch (11) of the first flange (1) and adjacent to the notch surface (52) of the first notch (21) of the second flange (2).

15. The method according to claim 13, further comprising a flange bending step in which at least the first flange (1) is bent up, wherein the flange bending step follows the cutting step and wherein the notch resizing step follows the flange bending step.

\* \* \* \* \*